United States Patent [19]

Tsuetaki et al.

[11] Patent Number: 4,693,572

[45] Date of Patent: Sep. 15, 1987

[54] MONOCENTRIC BIFOCAL CORNEAL CONTACT LENS

[75] Inventors: George F. Tsuetaki; Shiro Sato, both of Chicago, Ill.

[73] Assignee: Fused Kontacts of Chicago, Inc., Chicago, Ill.

[21] Appl. No.: 740,407

[22] Filed: Jun. 3, 1985

[51] Int. Cl.⁴ .......................... G02C 7/04; G02C 7/06
[52] U.S. Cl. ...................................... 351/161; 351/177
[58] Field of Search .............. 351/160 R, 160 H, 161, 351/162, 177

[56] References Cited

U.S. PATENT DOCUMENTS

| | | | |
|---|---|---|---|
| 1,414,117 | 4/1922 | Drescher | 351/168 |
| 3,415,597 | 12/1968 | Harman | 351/161 X |
| 3,973,838 | 8/1976 | Page | 351/161 X |

Primary Examiner—John K. Corbin
Assistant Examiner—Scott J. Sugarman

Attorney, Agent, or Firm—James T. FitzGibbon; Angelo J. Bufalino

[57] ABSTRACT

A bifocal contact lens blank having a front surface portion which is subdivided into distant and near vision front surface segments. The distant vision segment surface is defined by a partially spherical front surface with a first radius of curvature, and the near vision segment surface is defined by a spherical segment front surface portion with a smaller radius of curvature. The distant vision segment lies in the upper part of the lens blank and the near vision segment in the lower half; the surfaces meet along a locus of tangent points lying generally centrally of the lens and joined to each other on either side of this locus by a pair of offsetting front surfaces which extend between the lowermost edges of the distant vision segment surface and the uppermost edges of the near vision segment surface. These offsetting surfaces lie generally perpendicular to at least one of the segment surfaces, substantially along a meridian of the lens front surface.

8 Claims, 34 Drawing Figures

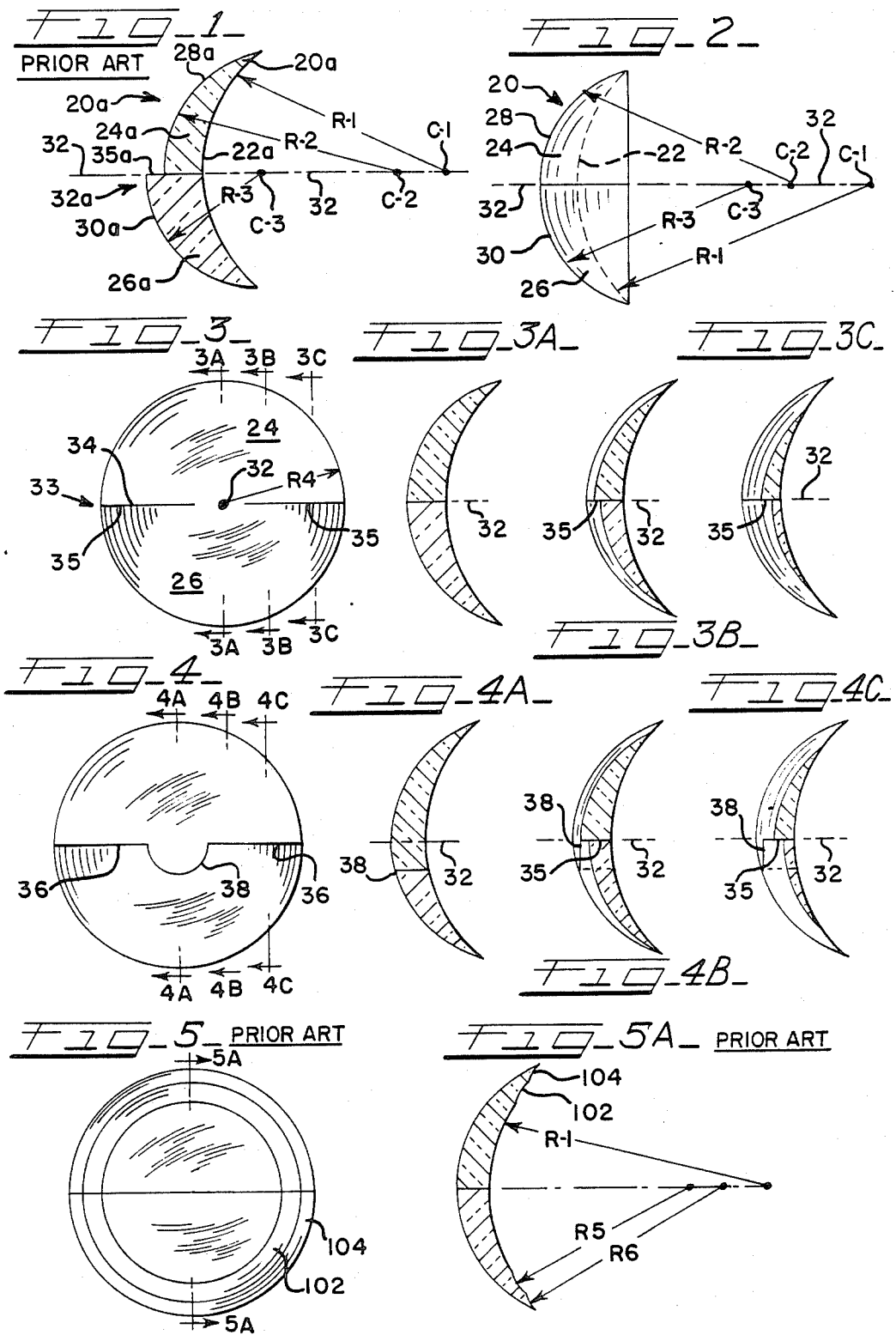

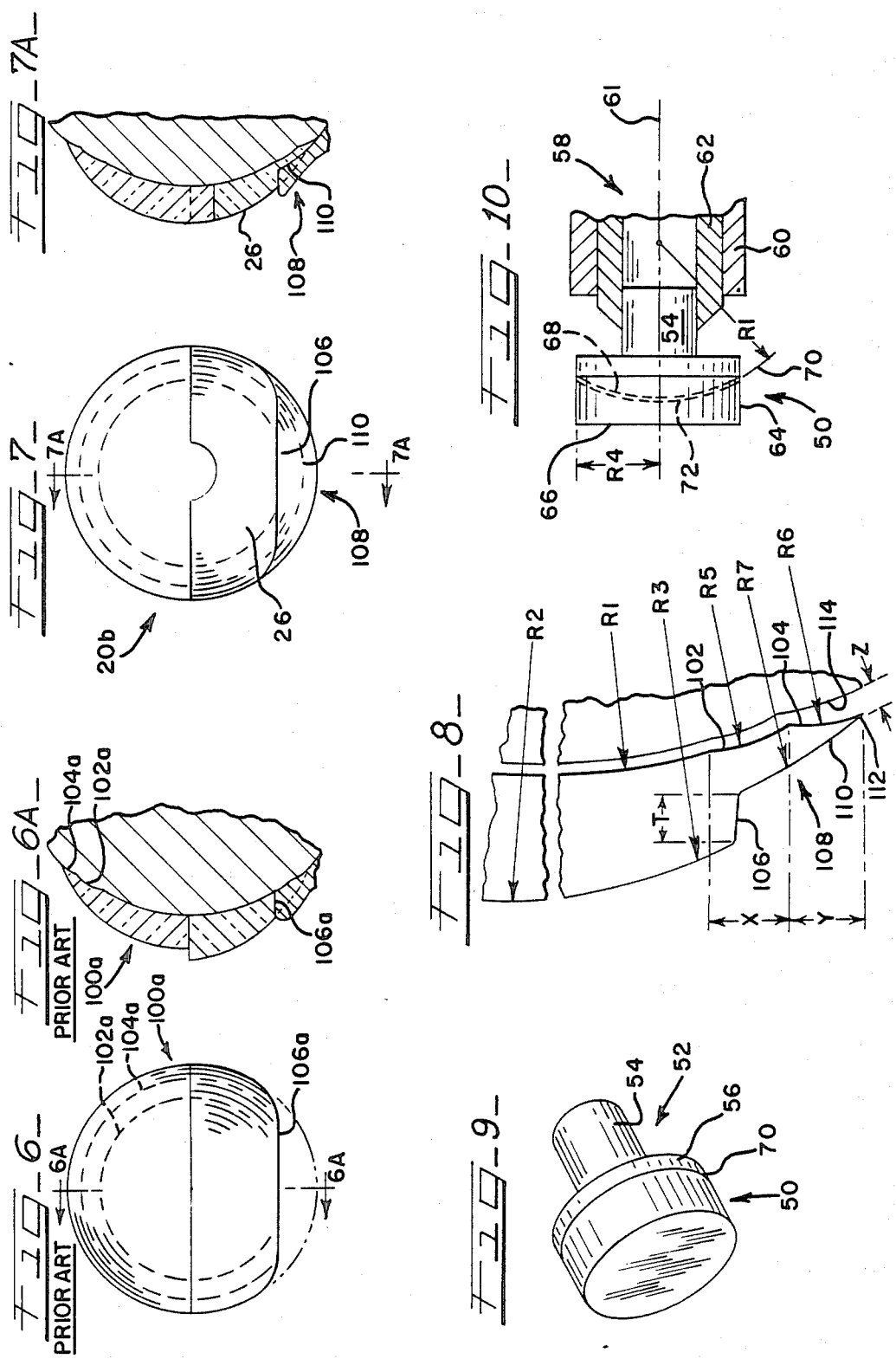

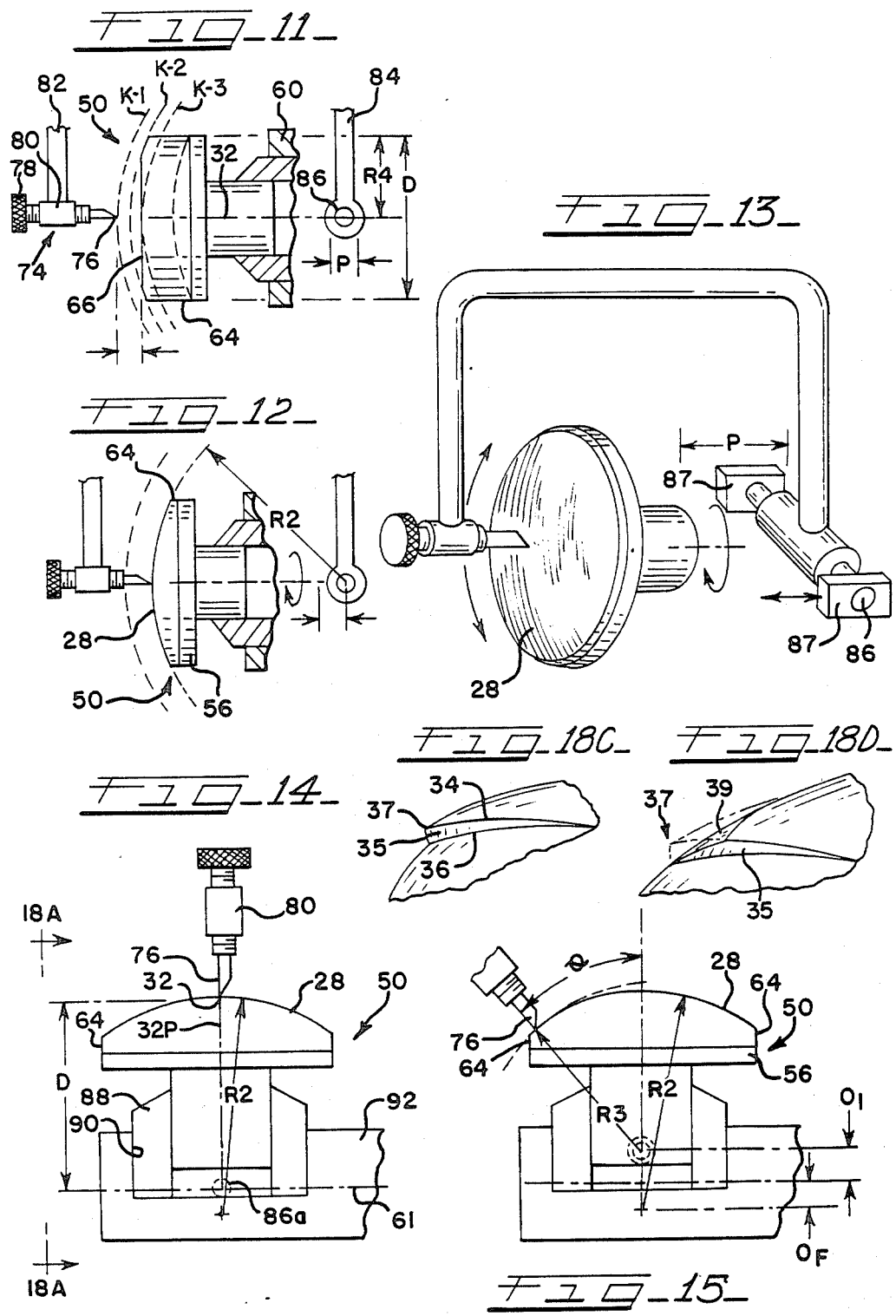

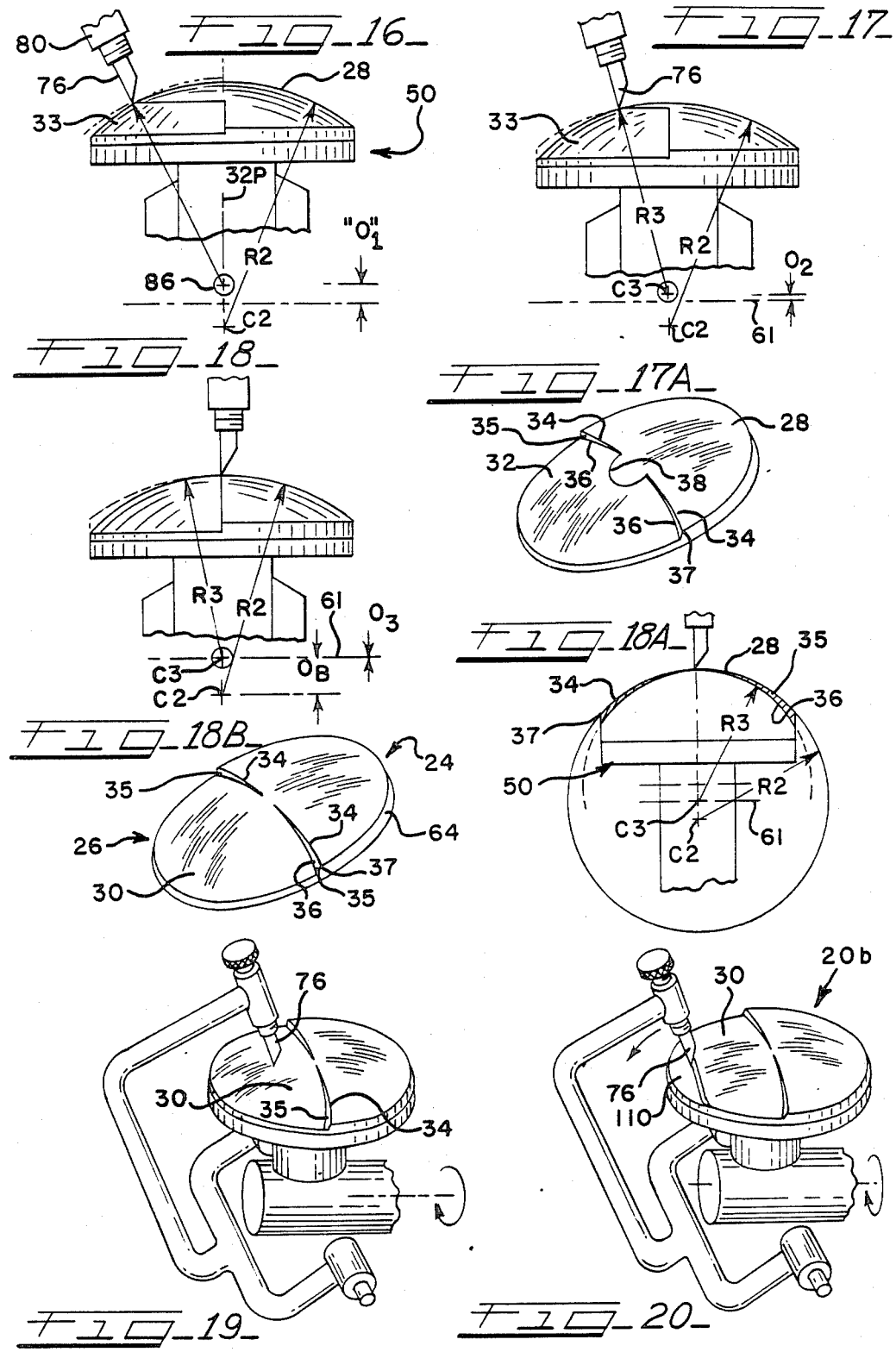

MONOCENTRIC BIFOCAL CORNEAL CONTACT LENS

BACKGROUND OF THE INVENTION

The present invention relates generally to corneal contact lenses and more particularly, to a bifocal corneal contact lens having a number of advantages and characteristics.

Corneal contact lenses, even bifocal contact lenses, have been known in the industry for many years. However, as with other finely engineered products, there is still room for improvement in such bifocal lenses; this situation has become particularly important with the advent of new compositions, especially gas permeable compositions, which hold out the promise of making bifocal contact lenses available to a wider range of the consuming public.

In particular, bifocal contact lenses of the prior art have suffered from several drawbacks. The first of these is that, in the case of most fused bifocal contact lenses, the near vision segment, which was embedded in the lens as a whole, was of a steeper or smaller radius curvature than that of the distant vision portion, thus inherently requiring the lens as a whole to be thicker than a one-piece counterpart lens. While this difficulty has been offset to a certain extent with the advent of more highly gas-permeable lens materials, the drawback still remains, namely, that since the near vision segment must be embedded in the lens as a whole, the thickness of the lens as a whole must exceed that of the near vision segment.

Another problem with prior art bifocal contact lenses has been the location of the segment line separating the near and distant vision segments from each other. In the customary one piece bifocal contact lens, the segment "line" is actually in the form of a surface or "shelf" which has several disadvantages in use.

Other one piece bifocal corneal contact lenses, particularly non-prismatic lenses, have suffered from a characteristically frequent failure of the desired upward translation of the lens relative to the cornea when the eye moves downward to the reading position. As a result, where the lens does not translate upwardly, it moves downwardly with the eye, and the line of sight does not desirably enter the near vision segment.

Another difficulty with bifocal contact lenses is the need, in almost all cases, to achieve proper lens orientation on the eye. For example, any bifocal other than a true concentric bifocal lens must be oriented in position in the eye, or the bifocal segment will not lie in the intended area as regards the line of sight of the wearer in its movement from distant to near vision positions. Thus, a properly designed bifocal segment is of little value if it does not reliably lie directly on the bottom of the cornea where downward eye movement during reading will cause the line of sight to move into the bifocal segment for close-up viewing.

In addition, problems of astigmatism are present in both single vision and bifocal lenses. A lens having astigmatic correction must orient in use on the eye, because astigmatism is manifested in different optical powers or different focal lengths along different meridians of the eye. If the grind of the lens matches the indicated correction along the various meridians of the eye, but the lens does not orient to the desired position, the astigmatic correction is of no value or may actually hinder vision. While a prism effect may be used with the lens of the present invention for orientation or for other reasons, the present invention provides a lens which will orient itself and which will provide easy upward translation in use on the eye without being prismatic.

In the prior art, orientation of a lens on the eye, both for astigmatic correction and/or bifocal use, has taken different forms. The most common form is that of cutting the lens as a prism wherein the bottom portion of the lens is of increased thickness relative to the top portion. This causes the lower half of the lens to be more massive and to orient by gravity into the desired position as the lens as a whole floats on the lachrymal fluid overlying the cornea of the eye. According to the invention, such a prism need not always be provided to achieve lens orientation on the eye.

In view of the shortcomings of prior art bifocal contact lenses, it is an object of the present invention to provide an improved bifocal contact lens.

Another object of the invention is to provide a method of manufacturing an improved bifocal contact lens.

A still further object of the invention is to provide a one-piece bifocal contact lens which is free from objectionable flare in use, especially when the user is facing a light source during use of the lens at night.

Another object of the invention is to provide a bifocal contact lens which is free from an objectionable, generally upwardly directed segment surface separating the near and distant vision segments of the lens.

Yet another object of the invention is to provide a bifocal contact lens wherein the segment line or surface separating the near and distant vision portions of the lens is non-existent or virtually non-existent at the lens center and wherein such surface, to the extent it does exist, is directed downwardly in use so as to avoid objectionable flare.

A further object of the invention is to provide a bifocal lens construction which is ideally adapted to provide a monocentric, no-jump, one-piece bifocal lens unit.

Still another object of the invention is to provide a method of manufacturing a one-piece bifocal contact lens wherein the segment line or surface may be made in the form of a straight line or in the form of a line or surface having generally straight margins and a curvilinear center portion lying below the optical center of the lens in the center portion of the lens only.

Another object of the invention is to provide a method of making a one-piece bifocal contact lens which includes forming a distant vision front surface on the lens blank by positioning the blank in a holder forming a part of a machine having a given axis of rotation rotating the holder and the lens blank about the machine axis while cutting the front surface portion of the blank with a tool swung about a tool pivot axis through an arc of a first radius to form a lens blank with a given optical center line, then positioning the blank so that its optical center line lies substantially perpendicular to the axis of machine rotation, and such that the radially outermost portion of the lens blank front surface is spaced from the machine center line axis by an amount equal to the intended radius of curvature of the near vision segment portion, positioning a cutting tool in a pivotable tool holder such that the tool point is spaced from the tool pivot axis by a distance equal to the intended radius of curvature of the bifocal segment front surface, and swinging the tool through an arc extending from a point on the lens edge to a meridian extending perpendicular to the arc, while moving the tool pivot axis from a point lying parallel to the plane of rotation of the lens blank centerline and offset from the machine axis toward a position coincident with the machine axis, to provide a one-piece bifocal lens unit.

Another object of the invention is to provide a contact lens wherein an improved ledge or like formation is provided to insure that, as the eye moves downward to the reading position, the lens translates upwardly relative to the cornea.

A still further object of the invention is to provide a lens having a circular profile in front elevation and a front surface portion provided with a generally horizontal, lid-engaging surface extending rearwardly from a lower portion of the lens with the lid-engaging surface terminating along an arcuate line at which it joins a reduced diameter lowermost front surface portion of the lens, with the rear surface of the lens including secondary and marginal curvature areas for overlying the cornea in a defined relation.

Another object of the invention is to provide a contact lens of generally circular outline in front elevation and having a rear surface portion which includes a base curve area having a base curvature of a given radius, a secondary curve margin area lying outside the base curve area, with the secondary curve area being formed on a greater radius than the base curve area and with the lens further including a peripheral curve area adjoining the outer edge of the secondary curve area and being formed on a greater radius than the secondary curve area, with the lower surface of the lens including a segment of reduced diameter in the lens front surface, with a generally horizontally extending, downwardly directed lid support surface extending between said reduced diameter segment and an adjacent margin of the lens front surface.

Another object of the invention is to provide the one-piece bifocal contact lens having a ledge or like lid-engaging surface which permits retention of the so-called secondary and peripheral cornea-engaging surfaces which extend about the entire lens outer diameter for greater comfort and stability.

Another object of the invention is to provide a new form of translation which is adaptable for use in one-piece bifocals as well as in fused bifocals and single vision prism lenses, and wherein improved lens orientation and comfort are provided for the wearer.

A still further object of the invention is to provide a method of making improved one-piece bifocal contact lenses including a method wherein the segment line or surface separating the near and distant vision portions may be made as a single meridian, or be made as a pair of meridian segments spaced apart by a downwardly extending curvilinear connecting line, without major alteration in the manufacturing method.

Yet another object of the invention is to provide a method of manufacturing one-piece bifocal lenses which is versatile in use and which is nonetheless adapted to provide high quality, reliable lenses.

The foregoing and other objects and advantages of the invention are achieved in practice by providing a one-piece bifocal contact lens, preferably of monocentric no-jump form, wherein the bifocal segment front surface portion of the lens has a smaller radius of curvature than of the distant vision segment, and wherein the front surface of the bifocal segment is tangent to the distant vision segment at a point or along a line or locus at or near the center of the segment line and wherein the surface separating these segments lies along a lens meridian.

The invention also achieves its objects and advantages by providing a lens having a novel modified form of truncation for providing a ledge for the lower lid to push the lens upward during reading while at the same time permitting the secondary and peripheral curves to remain completely intact throughout the circumference of the lens for maximum comfort.

The exact manner in which the invention achieves these and other objects and advantages will become more clearly apparent when reference is made to the following detailed description of the preferred embodiments of the invention set forth by way of example, and shown in the accompanying drawings, wherein like reference numbers indicate corresponding parts throughout.

BRIEF DESCRIPTION OF THE DRAWINGS

FIG. 1 is a vertical sectional view of a one-piece bifocal lens of the prior art;

FIG. 2 is a side elevational view of a novel lens unit of the present invention;

FIG. 3 is a front elevational view of the novel lens of FIG. 2;

FIGS. 3A, 3B and 3C are vertical sectional views taken along lines 3A—3A, 3B—3B and 3C—3C of FIG. 3, and showing the shape of the bifocal segment;

FIG. 4 is a front elevational view of a slightly modified form of lens of the invention;

FIGS. 4A, 4B and 4C are vertical sectional views taken respectively along lines 4A—4A, 4B—4B and 4C—4C of FIG. 4 and showing various aspects of the lens of FIG. 4;

FIG. 5 is a front elevational view of one form of prior art corneal contact lens;

FIG. 5A is a vertical sectional view of the prior art lens of FIG. 5;

FIG. 6 is a front elevational view of a common form of prior art bifocal contact lens;

FIG. 6A is a vertical sectional view of the prior art lens of FIG. 6, taken along lines 6A—6A thereof;

FIG. 7 is a front elevational view of one form of bifocal contact lens of the present invention;

FIG. 7A is a vertical sectional view taken along lines 7A—7A of FIG. 7 and showing the lens in its position of use on the eye of a wearer;

FIG. 8 is a greatly enlarged vertical sectional view of a portion of the lens of FIGS. 7 and 7A and showing the novel modified truncation in greater detail;

FIG. 9 is a perspective view of a "button" from which a finished lens of the invention may be cut;

FIG. 10 is an elevational view, partly diagrammatic in character, and showing the lens blank with the base curve completed, before beginning the first step in cutting the lens front surface, and showing certain reference dimensions;

FIG. 11 is a diagrammatic view similar to that of FIG. 10 and showing the first and several intermediate stages of the first step in manufacturing the lens front surface according to the invention;

FIG. 12 is a view similar to FIG. 11 and showing the completion of the first step in the manufacture of the lens front surface;

FIG. 13 is a perspective view showing the operational stages of FIGS. 11 and 12;

FIG. 14 is an elevational view, partly diagrammatic in character, showing the positioning of the lens blank before beginning manufacture of the near vision segment surface of the lens, and showing reference dimensions and relations;

FIG. 15 is a view similar to that of FIG. 14, and showing final positioning of the lens blank before beginning the first stages of the bifocal surface forming step of the invention;

FIG. 16 is a diagrammatic view showing an early phase or stage of the bifocal surface forming;

FIG. 17 is a view similar to FIG. 16 and showing the last step in manufacturing the near vision segment surface of the type shown in FIG. 4;

FIG. 17A is a perspective view of the lens resulting from the operation of FIG. 17;

FIG. 18 shows the last stage in the making a bifocal surface on a lens of the type shown in FIGS. 2 and 3;

FIG. 18A is a view taken along lines 18A—18A of FIG. 18;

FIG. 18B is a perspective view of finished lens made in the manner shown in FIG. 18;

FIGS. 18C-D are enlarged fragmentary perspective views of a portion of the lens of FIG. 18B.

FIG. 19 is a perspective view of a contact lens unit embodying the novel truncation feature shown in FIGS. 7 and 8; and FIG. 20 is a perspective view of a manufacturing step in the formation of the novel lens of FIG. 19.

DESCRIPTION OF THE PREFERRED EMBODIMENTS OF THE INVENTION

While it will be understood that the principles of the invention may be applied to other various forms of contact lenses, a description of a preferred form of the invention will be given wherein the principal features of the invention are embodied in a one-piece bifocal contact lens of the monocentric, "no-jump" type. For ease of understanding, prior art lenses or lens making practices may be described herein before the improved lens or method of the invention is described.

Referring now to the drawings in greater detail, FIG. 1 shows a prior art bifocal contact lens generally designated 20a and shown to include a principal body portion generally designated 21a. The body 21a is preferably formed from a plastic material and includes a rear or base curve surface 22a formed on a radius R-1 and having a center of curvature C-1. The lens includes an upper or distant vision segment 24a and lower or near vision segment 26a. The distant vision segment 24a has a front surface 28a having a radius of curvature R-2, and a center of curvature C-2. The lower or reading vision segment 26a has a front surface portion 30a having a radius of curvature R-3 and the center of curvature C-3. In FIG. 1, the lens is shown as having an optical axis line 32a; where all the centers of curvatures C-1, C-2, C-3 lie along the optical axis line 32a, the lens is said to be "monocentric". This feature, while not a necessary feature, is one which has certain advantages in use, as will appear.

Referring now to another feature of the prior art lens 20a, because radius R-3 is smaller than radius R-2, in prior art lenses, the surface 30a protrudes forwardly of the surface 28a in the segment line area generally designated 33a along which the distant and near vision segments 24a, 26a meet. This protrusion is the most pronounced at or near the lens center and creates a "shelf" 35a, which is illustrated in exaggerated form in FIG. 1. This "shelf" 35a creates upward reflections or "flare" in the lens as referred to herein and is a drawback of prior art one-piece bifocal lenses.

The lens of FIG. 1 is shown for illustrative purposes only and is therefore not shown as having a truncated bottom part nor as being prismatic; however, the representation of the lower or bifocal segment 26a, and particularly the "shelf" 35a forming a part of the segment line area 33a, which separates the near and distant vision segments from each other, may be clearly seen. The present invention overcomes the disadvantages associated with this prior art construction.

Referring now to FIG. 2, a novel bifocal contact lens generally designated 20 and shown to embody the present invention is illustrated. This lens 20 includes a rear surface of curvature 22, formed on radius R-1 and having a center of curvature C-1, a distant vision portion 24 and near vision portion or segment 26. The distant vision segment 24 has a front surface of curvature 28 formed on radius R-2 which has a center of curvature C-2, while the front surface 30 of the segment 26 has a radius of curvature R-3 and a center of curvature C-3.

As may be seen in FIGS. 2 and 3, the segment line area 33 separates the distant and near vision segments 24, 26, but this segment line provides a "shelf" surface 35 only away from the center of the segment or optical center, and the "shelf" surface 35 is of increasing thickness at the edges but virtually non-existent at the center of the lens. Very importantly, the shelf surface 36 faces downwardly or toward the near vision segment.

While the region of a contact lens 20 separating the distant vision portion from the near vision portion is often referred to as a segment "line", and is sometimes so referred to herein, such expression is a trivial or technology incorrect expression. This is because in reality, this separation is not properly described as a "line", but is actually a one-or-two part surface such as the surface 35 shown in FIGS. 3, 4, 17-20. This surface 35 extends between and joins the lower edge 34 of the distant vision surface 28 of the upper edge 36 of the lower or near vision segment surface 30. As shown in FIGS. 17A and 18B, for example, this surface which may be referred to as a transition surface 35, and is comprised of mirror image left and right hand portions lying to either side of the geometric lens center C-4.

As shown in FIG. 3, the lens as a whole has a radius R-4 with a center C-4, which for purposes of illustration, lies along the optical axis line 32. The construction of the lens of FIGS. 2 and 3 is such that the segment line area 33 approximately bisects lens 20. A shelf element 35 thus lies to either side of the geometric lens center C-4.

Referring to FIGS. 3A-3C, two important aspects of the invention are illustrated. The first is that the shelf surface 35 is fully developed only at the outer lateral edge, having some definition at an intermediate portion, and having no visible dimension whatever at or near the geometric center C-4 of the lens (FIG. 3A). Second, the "shelf" surface 35 are directed downwardly rather then upwardly as in the prior art.

Before referring in detail to the manufacture of such lens, the advantages of this construction will be pointed out.

According to the invention, a bifocal lens of this type, lacking the upwardly directed shelf surface, exhibits substantially or greatly reduced "flare" in use relative to a lens having an upwardly directed "shelf" surface 35 (FIG. 1) of the same thickness.

In night driving, for example, objectionable flare is not only very substantial in the case of prior art lenses, but is directed upwardly and toward the distant vision segment of the lens. This is the critical portion of the lens through which the driver is looking when driving. For auto drivers, aircraft pilots and others requiring keen, comfortable night vision, the existence of flare, particularly bifocal segment or "shelf" flare, is a very serious drawback.

As is apparent from the illustrations of FIGS. 2, 3 and 3A–3C, where the front surface portion 30 of the near vision segment 26 exactly meets the distant vision front surface 28, there is no segment line or line of demarcation, since these surfaces meet, or are tangent to each other at a single point, and are nearly tangent at closely adjacent points.

However, below the shelf 35, the front surface 30 is of a decreased radius or steeper taper, and hence, the front surface lies radially inwardly of an imaginary spherical locus which would be formed by an extension or continuation of the lens distant vision front surface 28. FIGS. 3B and 3C show that this steepness, while of the same radius, becomes more visible towards the edge of the lens, because at the lens edges, the respective surfaces are more remote from the single point of true tangency or coincidence. This is also quite clearly shown in FIG. 18B, (to which reference is made later,) for example.

It is believed that the present invention provides, for the first time, a novel monocentric bifocal having the above and other desirable characteristics.

Referring now to another closely related embodiment of the invention, FIG. 4 shows a novel bifocal contact lens wherein the segment "line" area 33 is substantially horizontal except near the center of the lens. In this case, the segment surfaces 35 extend laterally to either side of the lens center and join the outside edges thereof; however, near the lens center, the segment line area 33 includes an approximately semicircular arc portion 38. In other respects, the lens of FIG. 4 is similar to that of its counterpart shown in FIGS. 2 and 3, and a comparison of FIGS. 3A and 4A shows that the front surface portion 28 of the distant vision segment 24 merely extends downwardly somewhat farther at the center portion of the lens than it does towards the edges. Consequently, the segment line is not completely horizontal throughout, but includes flank portions 35 and a center portion 38. This line 38 may be thought of as a locus of tangent points or points at which the surfaces 28, 30 are tangent to each other rather than offset from each other.

A consequence of using this form of lens is that when the eye is centered with respect to left and right, the line of sight will also pass through the distant vision segment even when such sight line is slightly below the lens center. Beyond a millimeter or so to either side of the lens center, if the line of sight falls below the lens center, such sight line will pass through the near vision segment portion 26 of the lens 20.

This form of segment resembles, but is not identical to, that form of segment used in a fused bifocal lens and described in my U.S. Pat. No. 4,302,081, issued Nov. 24, 1981. This shape of segment is preferred in certain known application.

Referring now to FIGS. 9–19, the preferred method of making the one-piece bifocal lens of the invention is shown.

Referring specifically to FIG. 9, there is shown a lens blank 50, mounted on a post assembly 52 which includes a reduced diameter shank portion 54 and an enlarged diameter head portion 56 over which the cylindrical lens blank 50 is mounted. Referring to FIG. 10, it is shown that the lathe or like machine generally designated 58 includes a headstock spindle 60 having a collett chuck 62 therein which grasps the shank 54 of the post assembly 52. The machine headstock rotates about a machine axis 61 which normally forms the optical centerline axis of the lens blank 50.

As shown, the lens blank 50 includes a cylindrical outer surface portion 64, a flat front face portion 66, and a rear contoured surface 68. In this connection, it will be appreciated that, in lens manufacture, the lens blank 50 is first mounted in a suitable holder such as the head stock of a lathe (not shown) and rotated while the base curve 68 is cut and polished. The base curve 68 shown in FIG. 10 would correspond to the base curve 22 in the finished lens such as the lens shown in FIG. 2.

Accordingly, as is well known in the art, a certain base curve dimension is selected based on the anticipated fitting of the lens to the eye, and the curve 68 is then cut. Thereafter, the lens blank 50, having this surface 68 is affixed by a special pitch or like type adhesive 70 placed over the end face 72 of the post assembly. This secures the lens blank 50 for further cutting steps and permits ready removal of the lens from the fixture once it is finish ground. This method affixation eliminates the need for grasping the lens mechanically as by a chuck or the like when it is receiving its finished cuts.

Consequently, in the above description, and in the description following, when reference is made to the first and second steps of the cutting and polishing process, etc., it will be understood that reference is intended to be made to the cutting of the front surface portion and that the cutting of the rear surface of the lens, which is accomplished earlier, is not an aspect of the invention which is new per se.

Referring now to FIG. 11, certain dimensional relations and portions of the equipment preferably used in forming a lens of the invention are shown. As can be seen, the lens blank 50 has an overall diameter "D", the diameter of the surface 64 and twice the length of the radius R-4. A cutting tool generally designated 74 and shown to include a cutting tip 76, the position of which is adjustable by a thumb screw 78, which moves within a tool mounting or holder assembly 80 affixed to the end portion 82 of a tool mount assembly 84. The assembly 84 is pivotable about a post 86 which under ordinary circumstances is positioned so as to intersect the longitudinal center line 32 of the lens blank. For purposes of the present illustration, it will be assumed that the lens blank 50 is centered with respect to the post assembly 52, and that prismatic or off-center cuts are not being made. Hence, the center line axis 32 of the machine headstock 60, the center line axis of the shank 54 and that of the lens blank 50 as a whole are all coincident.

It is further shown in FIG. 11, the post 86 is secured in a carriage 87 or the like (not shown in detail) permitting it to move through a range of positions "P" for cutting lenses of various thicknesses. FIG. 11 shows that, when the lathe headstock 60 is rotated, and the thumbscrew 78 is manipulated so as to position the tool point 76, a given distance R-2 from the center of the tool arm pivot 86, then such radius R-2 will be the radius of curvature of lens front surface portion. Having established this distance as by prescription or otherwise, the headstock is then rotated and the carriage 87 is moved throughout the position range "P" as shown, forming, for purposes of illustration, a series of cuts, K-1, K-2, K-3, etc.

Actually, rather than separate individual cuts of a given depth, these distances represent the gradual progression of cuts made as the carriage 87 is traversed at least to the extent that the tool point 76 has cut some material from the entire front face 66 of the lens blank 50. The corners of the blank are thus cut, first as shown in FIG. 11, and thereafter movement of the tool through the range of positions takes place as cutting continues.

Referring now to FIG. 12, with the distance R-2 remaining constant, the entire range of movement P has been taken up as shown in FIG. 12 and a spherical surface 28 has been imparted to the front surface of the lens blank 50; and uncut outer cylindrical edge 64 of a finite thickness remains, and the partially cut lens remains fixed to the enlarged head portion 56 of the post assembly 52.

Because of the concentric arrangements of parts and the rotation of the blank described in the swinging of the tool point through a circular arc, the surface 28 is, by definition, a spherical surface. FIG. 13 illustrates in perspective the movement of the tool post 86 as a part of a carriage mechanism 87 with such movement being carried out until the spherical surface segment 28 is formed as shown.

Referring now to FIG. 14, the next step in forming the front surface of lenses made according to the invention is shown. Here, the lens blank 50 is shown to have been repositioned such that the center line axis 32 of the lens blank now extends perpendicular to the center line axis 61 of the machine. A specially made collet assembly 88 is disposed in a pocket 90 formed in a spindle 92 which rotates with the headstock of the lathe (not shown). FIG. 14 shows that, if the tool point 76 is disposed a distance R-2 from the center line axis 61 of the lathe, and if the tool holder 80 is positioned for arcuate movement about the pivot point 86, then if the machine headstock is rotated and the tool point 76 is swung, it will be exactly tangent to the spherical lens front surface 28 and no portion of the surface will be cut.

If the tool point 76 is adjusted to a position such that it is spaced a distance R-3 from the tool holder pivot point, then, to the extent the pivot axis 86 is positioned properly, a surface having a radius of curvature R-3 will be cut in the blank 50 at an appropriate depth. However, if the lens blank 50 is positioned in the holder 88 such that the center of the lens blank front surface 28 is a distance R-2 from the machine center line 61, then the surface cut in the blank 50 by the tool point 76 upon revolution of the headstock would merely be a spherical surface concentric but spaced inwardly from the spherical surface 28; the two surfaces thus cut could be considered as concentric shells.

However, according to the invention, it is desired that a surface of curvature having a given but decreased radius R-3 be cut in the surface 28 of the lens blank such that the newly formed surface 30 is tangent to the surface 28 at a single point only.

Therefore, according to the invention, and referring to FIG. 15, a measurement of the differences between the radii R-2 and R-3 is taken. This gives a final distance "$O_B$" (FIG. 15) which is the blank offset or the distance between the radius of curvature of the distant vision surface 28 and the radius of the near vision segment. The lens blank 50 is then positioned in the collet 88 so that the portion of the surface 28 lying along a plane perpendicular to the machine center line axis is equal to the dimension of radius R-2. Thereupon, the entire blank 50 is moved radially inwardly of the headstock or fixture such that the surface 28 moves inwardly a distance equal to the blank offset distance "$O_B$". The tool is arranged so that its pivot axis 86a can be positioned to intersect the machine center line axis 61, but the tool point pivot axis 86 is placed an itítial offset distance $O_1$ from the machine centerline 61.

Next, as shown in FIG. 16, the tool holder 80 is swung through an angle such as that shown in FIG. 16 and the spindle is rotated. Then, the tool point 76 is gradually moved by moving the carriage so as to move the pivot point 86 toward an intersection with the machine centerline 61.

As this occurs and as the spindle rotates, with the tool holder 80 being swung through an arc of angularity $\theta$, a spherical near vision segment 30a begins being cut on the surface 28 of the blank 50. As shown in FIG. 17, with the tool pivot point 86 being gradually moved toward centerline 61, the width of the cut portion 30a gradually increases.

Referring to FIG. 18A, it will be noted that the being formed surface 30a is gradually increasing in width. When the tool pivot point 86 reaches the exact centerline 61, both the surfaces 28 and 33 coincide at a single point, and a lens such as that shown in FIG. 18B is has been formed. Referring again to FIG. 18A, it will be noted that, when viewed from the axis of rotation, that the surface 28 of the lens blank is of a larger diameter than the newly formed surface 30 of the bifocal segment. In other words, because the blank 50 is rotating about one axis, and the tool is swung about another, perpendicular axis, a spherical surface of a smaller radius is seen to be offset in along two perpendicular axes. However, because the blank 50 itself is offset in the spindle in the sense that its outer surface 28 describes an arc different from the trace of its rotation within the tool, the near and distant vision segment portions will be tangent only at a single point and the pair of opposed "shelf" surfaces 35 will be formed as shown.

Referring now specifically to FIGS. 16, 17 and 17A, it will be noted that where the tool point 76 is moved gradually radially inwardly as described, and the being formed front surface 30 is formed as shown because the tool point 76 does not contact all portions of the surface 28, there is a point at which, while a cut of radius R-3 is being made, not all of the lower lens half front surface 30 will be cut by the tool. This is because the tool pivot point or axis 86 is spaced outwardly by an offset distance $O_2$ from the machine centerline axis 61. This, in turn, results in a lens of the type shown in FIG. 17A, and the line or surface 38 is thus a curvilinear locus of tangent points between the two spherical surfaces 30, 28 rather than a single point as is shown in FIG. 18B, for example.

Depending upon the manipulation of the tools, the arcuate locus 38 may be made as small in diameter as is desired. This locus, together with the generally radially extending top edges 36 of the lower or near vision segment surface 30 define the upper perimeter of the near vision segment 26. Referring to FIG. 18A, cross hatching is provided to show for emphasis the ledge surface 35 which is of increasing depth towards the outer margin of the lens. Radii R-2 and R-3, and edges 34, 36, are illustrated to show more clearly how the ledge surface 35 is defined.

Referring now to a modification of the described method, the near vision segment front surface 30 is shown as joining a distant vision front surface 28 at the center of lens. It is apparent that, were the angles through which the tool carrier 80 was swung reduced to a position short or perpendicular to the rotational axis of the spindle, then the segment line would lie below the mid point of the lens. Were the tool to be swung through a greater arc with the radii suitably adjusted, the segment line would lie above the center line of the lens.

In the foregoing description, no offset between the geometric lens center and the lens holding fixture have been illustrated. It is understood that, if the rear or base curve surface were cut about a certain geometric center, and the blank thereafter rotated about a centerline offset from that centerline when the front surface was being cut by a tool centered with respect to the machine axis, a prismatic lens would result. Likewise, the formation of toric or other aspheric surfaces could be accomplished by providing such offsets or otherwise as known to those skilled in the art.

Referring now to FIGS. 18C–D, there is shown an optional feature of the invention. As may be seen from referring to FIG. 18B, for example, on the outermost edges of each shelf surface 35, there is a relatively sharp corner 37 at which the end of the surface 35 extends between spaced apart sections of the edges 34, 36. This presents a sharp corner 37, which might be of measurable dimension where the near vision segment surface 30 is of a substantially smaller radius than the distant vision segment surface 28.

Accordingly, as shown in FIG. 18D, after the lens is manufactured, this corner 37 may be removed by grinding or cutting a flared margin 39 in the lower corner of the distant vision segment surface 28 just at and above its outermost extremity. This creates a contoured surface 39 which lies well outside the portion of the lens through which the line of sight would pass. By eliminating the corner 37, the surface 35 becomes a somewhat crescent-like surface rather than a blunt edged surface. This diminishes or eliminates the likelihood that the upper lid might engage this corner surface and undesirably lift or spin the lens, without adversely affecting the desirable feature of having the shelf surface or be directed downwardly. In the above connection, the contour of the surface 35 when viewed in plan might be described as a surface lying between two circular arcs which have a single tangent point; this surface may be referred to herein or in the claims as merely an offsetting surface extending between the near and distant vision segments or as an involute surface extending between these surfaces.

Referring now to another aspect of the invention, namely, the novel lid-engaging feature, reference is made to FIGS. 7, 7A, 8 and 20 for an understanding of this aspect of the invention.

FIGS. 7 and 7A show a lens 20b incorporating the additional comfort and security feature of the invention. In this lens, distant and near vision segments 24, 26 are provided, having front surface portions 28, 30, respectively, secondary and peripheral curves 102, 104 are provided not only around the upper portion of the lens, but on its lower most portions wherein such surfaces form a portion of an extension segment 108. In order to appreciate this aspect of the invention, the lenses must be contrasted with prior art lenses of the type having truncated lower portions and shown in FIGS. 6 and 6A, for example.

Prior art lenses, such as the lens 100a (FIG. 6) have been provided with so-called "secondary curve" and "peripheral curve" surfaces 102a, 104a which are placed on the rear surface of the lens to provide better fit thereof over the cornea. When the lens is truncated so as to provide a flat bottom surface 106a, the margins 102a, 104a are cut off or truncated with the remainder of the bottom portion of the lens. Accordingly, while the cut off bottom portion provides an adequate lid-engaging action, for lens translation, the discontinuities of the margins provide a less than optimum fit relation between the rear surface of the lens and the cornea with which it is associated in use.

Accordingly, the present invention provides, in one of its aspects, a lid-engaging surface 106 adapted to aid in lens translation, combined with the retention of the secondary and peripheral curve areas throughout the entire lens circumference. The lid engaging surface 106 is formed in a lower margin portion of the near vision segment 26; beneath this surface 106, which extends substantially horizontally in use, is a spherical extension segment 108. This segment 108 has a front surface portion 110 which is itself curved on a radius just smaller than that of the of the near vision segment of the front surface 30. As a consequence, the two margins 102, 104 which extend about the remainder of the lens rear surface are also formed in this auxiliary segment 108. The annular surfaces 102, 104 have radii of curvature R-5 and R-6, respectively.

Referring now to the typical values for the various radii of curvature, while these values may be varied if indicated, it is customary for the secondary curve portion of the lens, identified as radius R-5 in FIG. 8, to be a radius which is 1.4 mm greater than the radius of the base curve, R-1 in FIG. 8. The secondary curve normally has a radial width of 0.5 mm, shown as dimension X in FIG. 8. The width of the peripheral curve, identified as dimension Y in FIG. 8, is normally 0.3 mm, and its radius, determined as set forth below, is shown as R-6.

Normally, as shown in FIG. 8, an extension of the secondary curve surface blank towards a point just underlying the radial edge 112 would create a distance between the lens edge and the corneal surface of about 0.07 mm. This second or peripheral curvature is then arranged so as to add an additional 0.02 to 0.025 mm of distance in this region. Bearing these criteria in mind, its exact radius curvature R-6 can be determined.

Referring now to FIG. 20, the cutting of the lid engagement surface 106 is illustrated. Here, when the dimensional thickness or width T in FIG. 8 of the surface 106 has been determined, normally 0.3 to 0.4 mm, the adjustment screw 78 on the tool holder 80 is manipulated so that the cutting edge 76 of the tool is moved inwardly in a predetermined width or distance "T". As the lens blank is rotated as shown in FIG. 20, moving the cutting tool through an arc as illustrated, (Radius R-7 in FIG. 8) will create a slight cut and form a surface 110 exactly parallel to the curvature of the front surface 30 of the near vision segment. With the adjustment of the screw 78 being made continuously, or from time to time until the requisite depth is achieved, a modified lens 20b of the kind shown in FIG. 20 will result.

While it is not necessary that the orientation feature in the form of the arcuate lid-engaging surface subdividing the bifocal segment front surface into two sections be used only with contact lenses made according to the present invention, it is apparent that the machines used to form the novel bifocal may also be used to impart the orienting feature as a mere additional or final cutting step used in making the bifocal front surface.

It will be appreciated that the method is applicable to hard or soft single vision lenses of the prismatic type as well as hard or soft bifocal prism type lenses.

Tests have shown that the additional comfort and security derived from maintaining the secondary curve and peripheral curve portions of the contact lens throughout its entire circumference are significant. The width of the lid-engaging surface may be made sufficient to achieve the intended purpose without materially weakening the lens. The comfort of the lens has been found superior to that of prior art truncated lenses, and lenses displacement is achieved very reliably and comfortably.

A construction has been illustrated wherein the lens in monocentric; that is, the various centers of curvature of the front and rear surfaces and the bifocal segment are located on the optical center of the lens. This is an advantage, but is not strictly necessary to the practice of all aspects of the invention.

Referring now to other general aspects of the methods described above, it will be understood that, when the lens blank 50 is positioned for rotation as shown in FIGS. 14 and 15, for example. The geometric center line of the lens blank (32 in FIGS. 14 and 15) is positioned perpendicular to the axis of machine rotation 61. Consequently, rotation of the blank 50 will cause a projection of the line 32 about the center line 61 to describe a flat plane 32P perpendicular to the axis 61.

The tool point 76 is swung through an arc of radius R-3 lying to one axial side only of the intersection between the plane of rotation 32P and the outer edge of the lens. Under these circumstances, the near vision segment surface 30 will occupy exactly half of the lens blank front surface, and the offsetting surfaces 35 will be planar surfaces lying substantially perpendicular to the front surface of the lens, and will lie on a common meridian on the lens as a whole.

The edge portions 34, 36 of the upper and lower segments respectively will lie along this meridian and will appear to lie in a straight line when the lens is viewed in front elevation. The segment "line" area 33 will thus be defined by discontinuous edge lines 34 which are meridians on the distant vision front surface 28, and also by discontinuous edge lines 36 which are meridians on the near vision surface 30. The plane occupied by the offsetting surfaces 35 lies substantially perpendicular to the surface 30, being formed when radius R-3 is being cut.

Referring now to FIG. 15, for example, and to another aspect of the preferred method, the movement of the tool pivot axis 86 from its offset position 0-1 to its point of coincidence with the machine center line axis 61 this has been described as the preferred method. This step also includes pre-setting the distance between the tool point 76 and the pivot axis 86 to the exact predetermined radius R-3 of the near vision segment. When this method is practiced, and movement of the tool pivot axis 86 is stopped just short of coincidence with the axis 61, as shown in FIG. 17, for example, the form of lens shown in FIG. 17A will be produced, and such lens will have radius R-3 as its near vision segment radius of curvature.

Where the form of lens shown in FIG. 18B is being made, an alternate method is clearly available. This consists of centering the tool pivot axis 86 with respect to the center line 61, and beginning the cut with the tool being point 76 being swung through a radius greater than the radius R-3, and gradually being adjusted to a smaller radius wherein the tool point becomes exactly tangent to the lowermost portion of the lens distant vision front segment surface 28. Both methods are equally applicable for making lenses such as those shown in FIGS. 18B and 19, for example.

The method described also assumes that the pivot axis 86 of the tool holder 80 will always lie within the perpendicular plane 32P just referred to. Thus, axis 86 will be perpendicular to the machine axis 61 at all times, and either intersect such axis (FIG. 18) or be more or less offset from this axis 61 (FIGS. 16 and 17), but will normally lie someplace within the plane 32.

While the invention might be practiced in such a way that the segment "line" area 33 might not always exactly bisect the lens, and while the tool point might be such that the surface segments 35 are not truly planar, and while the tool pivot axis might be offset from the plane just described, a preferred form of method is that shown and described herein. Accordingly, in the claims, when reference is made to such referred planes, axes or dimensions, it will be understood that such expressions are intended to cover these preferred arrangements as well as their counterparts which differ slightly in arrangement or dimension.

It will thus be seen that the present invention provides novel bifocal contact lenses and other lenses having a number of advantages and characteristics, including those pointed out herein and other which are inherent in the invention.

Several preferred embodiments having been described by way of example, it is anticipated that various changes and modifications to the described form of apparatus may be made by those skilled in the art without departing from the spirit of the invention or the scope of the appended claims.

We claim:

1. A bifocal contact lens blank having a front surface portion which is subdivided into distant and near vision front surface segments, said distant vision segment surface being defined, at least in part, by a front surface portion in the form of a segment of a sphere having a first, given radius of curvature, said near vision segment surface being defined at least in part by a front surface portion in the form of a segment of a sphere having a second, given radius of curvature which is smaller than the said first given radius of curvature, said distant vision segment lying in approximately the upper half of said lens blank and said near vision segment lying in the lower half of said lens blank, said surfaces meeting each other along a locus of tangent points lying generally centrally of the lens and being joined to each other on either side of said locus of tangent points by a pair of offsetting front surfaces extending between the lowermost edges of said distant vision segment surface and the uppermost edges of said near vision segment, said offsetting surfaces extending generally perpendicular to at least one of said near and distant vision front surfaces of said lens, and substantially along a meridian of said lens front surface, said offsetting surfaces, being adopted, in use, to face toward the lower lid of the wearer.

2. A bifocal contact lens blank as defined in claim 1 wherein said locus of tangent points is in generally semi-circular form, said semi-circle extending downwardly from the radially innermost edges of said offsetting surfaces, said semi-circular locus lying generally parallel to the outer diameter of the lower edge portion of said lens blank.

3. A bifocal contact lens blank as defined in claim 1 wherein said locus of tangent points is substantially a single point, said offsetting front surfaces having their innermost edges substantially tangent to each other.

4. A contact lens blank as defined in claim 1 wherein said distant and near vision front surface segment radii of curvature are arranged such that the centers of curvature of such radii lie on the optical center line of the lens blank, said lens blank thereby being a monocentric blank.

5. A corneal contact lens made from a single piece of optically transparent material, said lens having a rear surface adapted to overlie the cornea of the eye in use, said rear surface having a given radius of curvature and a given center of curvature, with the front surface of said lens being subdivided into distant vision and near vision areas, with said distant vision area, in position of use of the lens, lying on the upper half of the lens and the near vision segment lying on the lower half of the lens, said two segments occupying substantially the entire front surface of the lens, and with the distant vision segment terminating in at least one lower edge portion which extends, throughout the major part of its extent, substantially horizontally along a lens meridian, said near vision segment terminating in at least one upper edge portion extending, throughout the major portion of its extent, substantially horizontally and in substantial radial alignment with said at least one lower edge of said distant vision segment, said near and distant vision segments meeting each other along a locus of tangent points lying generally centrally of said lens front surface, and being joined to each other at remaining points on said lens front surface by a pair of offsetting surfaces extending generally radially between adjacent portions, respectively, of said upper and lower edges of said near and distant vision front surfaces, said offsetting surfaces having portions of increasing width as such surfaces approach the radially outer margins of said lens.

6. A corneal contact lens as defined in claim 5 in which said locus of tangent points lying generally centrally of said lens front surface comprises substantially a single point, with said pair of offsetting surfaces having their radially innermost edges virtually tangent to each other so as to form, in effect, a single segment line.

7. A corneal contact lens as defined in claim 5 wherein each of said rear surface, distant vision front surface and near vision front surface radii of curvature has a given center of curvature, and wherein all of said centers of curvature lie on substantially a single straight line, thereby rendering said contact lens unit a monocentric bifocal lens.

8. In a corneal contact lens unit made from an optically transparent material and including a front surface portion, a rear surface portion and an outer edge portion of substantially circular configuration in front elevation, said rear surface portion being subdivided into three areas, said areas including a center section of generally circular form in front elevation and being adapted to overlie the cornea, said center section having a given, first radius of rear surface curvature, a second area in the form of a circumferentially extending peripheral surface lying adjacent the outer periphery of said lens, being annular in front elevation and having a radius of peripheral surface curvature greater than said given first radius of rear surface curvature, and a third area in the form of a circumferentially extending secondary surface of annular form in elevation and lying intermediate said center section area and said peripheral surface area, said secondary surface having a given, secondary radius of rear curvature greater than said first radius of rear surface curvature, and less than said radius of curvature of said peripheral surface, whereby said rear surface includes center, secondary curve, and peripheral curve bands of increasing radii of curvature, the improvement comprising said lens front surface having a lower front surface portion which in turn is subdivided into a lowermost chordal surface adapted to be covered by the lower lid and an intermediate surface portion adapted to be seen through by the user, said lowermost chordal surface and said intermediate surface portions being radially offset from each other and joined to each other by a lid-engaging lens support surface extending generally horizontally across the lens in position of use, said support surface facing downwardly so as to engage the upper surface of said lower lid, with said lowermost chordal surface having at least portions of its rear surface formed by portions of said peripheral and secondary curve rear lens surfaces, whereby said lens may closely and comfortably overlie said cornea without impairing the ability of said lens to translate in response to downward eye movement.

* * * * *